Patented Feb. 19, 1924.

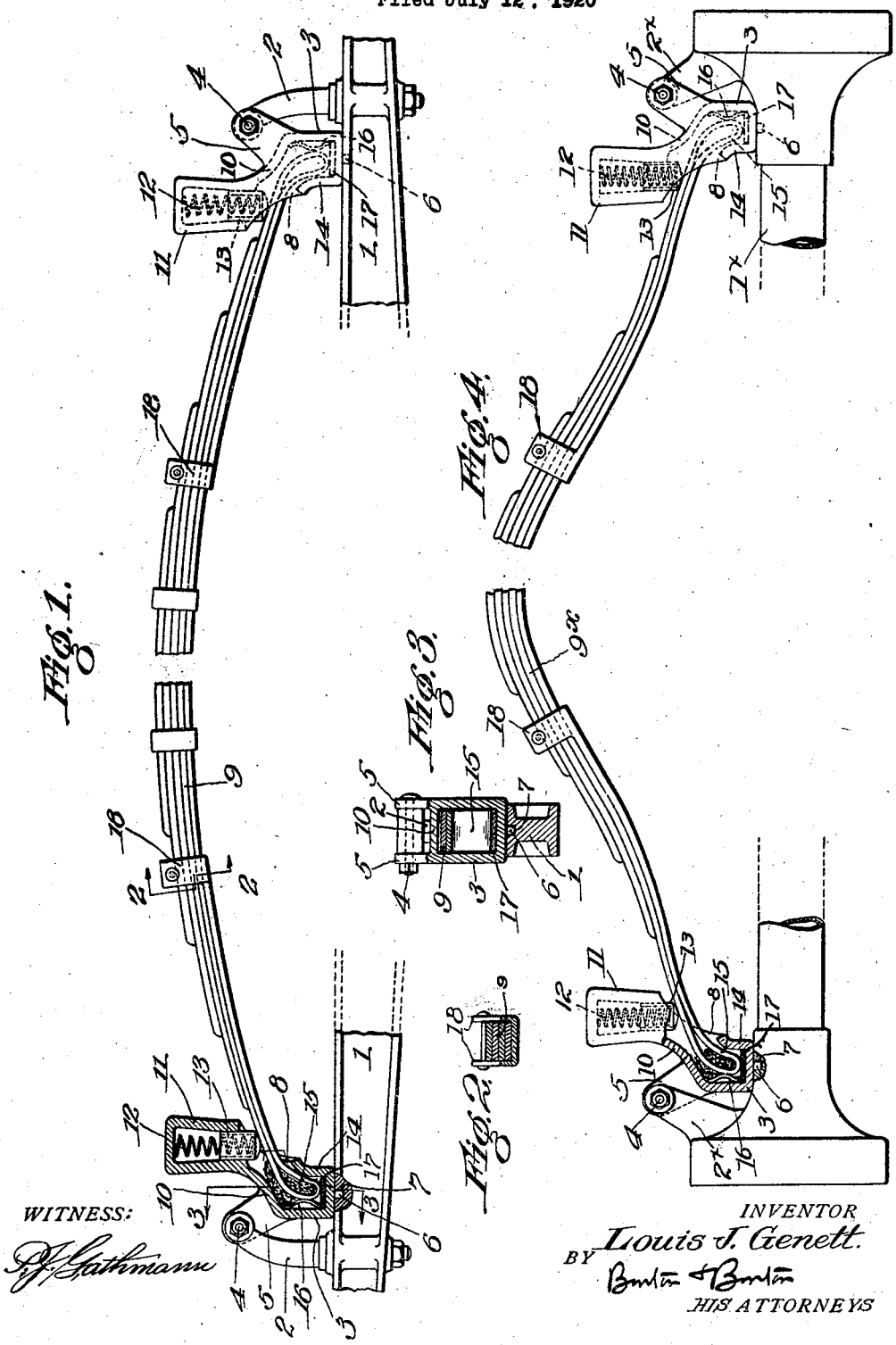

1,484,127

UNITED STATES PATENT OFFICE.

LOUIS J. GENETT, OF MARQUETTE, MICHIGAN, ASSIGNOR OF ONE-HALF TO JOHN M. LONGYEAR, JR., OF MARQUETTE, MICHIGAN.

VEHICLE SPRING MOUNT.

Application filed July 12, 1920. Serial No. 395,441.

*To all whom it may concern:*

Be it known that I, LOUIS J. GENETT, a citizen of the United States, residing at Marquette, in the county of Marquette and the State of Michigan, have invented certain new and useful Improvements in Vehicle Spring Mounts, of which the following is a specification, reference being had to the accompanying drawings, forming a part thereof.

This invention relates to vehicle-supporting springs and means for mounting them. It consists in the features and elements and their combinations, hereinafter described and shown in the drawings, as indicated in the claims.

In the drawings:—

Figure 1 is a side elevation in part section, of a spring embodying my invention.

Figure 2 is a section at the line 2—2, on Figure 1.

Figure 3 is a section at the line 3—3, on Figure 1.

Figure 4 is a view similar to Figure 1, showing a rear axle and spring with this invention applied thereto.

It is common practice to mount springs of the type known as semi-elliptical when used in the position shown in the drawings by securing the center to the chassis and connecting each end to the axle by a shackle or short link whereby the end of the spring is positioned below the point of support of the shackle.

These shackles are primarily intended to provide for the elongation of the spring when under load; but in any position less than the maximum flexure they also undesirably admit of a side sway and rocking of the chassis due to the peculiar action of the shackle which permits the spring ends to sway laterally with respect to the vehicle.

The present invention aims to overcome this difficulty by eliminating the shackles and so forming the spring that the ends thereof may be supported in fittings which are stationarily secured in position on the axle. The brackets, or perches, originally intended for supporting the upper ends of the shackles may serve for such securement.

For purpose of illustration the drawing indicates a type of spring and axle of familiar outline as used in automobiles having both springs lying in planes parallel to the front and rear axle; that is, across the chassis.

The front axle, 1, as shown in Figure 1, has the usual spring perch, 2, to which a fitting, 3, is secured by means of a bolt, 4, taking through the ears, or lugs, 5. The fitting, 3, is further secured in position by the downwardly projecting pin, 6, occupying a hole, 7, drilled in the axle near the perch, 2. The member, 6, may be a separate pin, or it may be cast integral with the fitting, 3, as shown.

The body portion of the fitting, 3, is of box-like formation with an opening, 8, at one side, into which the end of the spring, 9, is introduced. The overhanging lip, 10, prevents the accidental displacement of the spring.

Projecting from the lip, 10, is a housing, 11, for a helical spring, 12, whose function is to absorb the shock to which the chassis or load-carrying portion of the vehicle is exposed from the up-and-down movement of the wheels and axles, resultant from passing over irregularities in the road-bed, and serving particularly to shield or protect the forward end of the vehicle where the engine is usually located, from the shock of the rebound incident to sudden deflection of the transverse spring. To prevent the shock-absorbing spring, 12, from being displaced there is provided at its lower end a hollow or cup-shaped plunger, 13, whose lower end is rounded and in contact with the spring, 9. The spring, 12, reacts against the top of the housing, 11, and the plunger, 13, is guided in its vertical course in the housing, 11, as shown in Figure 1.

The inner vertical wall, 14, of the fitting just below the opening, 8, for the spring, 9, co-acts with the loop, 15, at the end of the said spring, 9, for retaining it in position and centering it with respect to the medial line of the wheel tread; such centering is further assisted by the small flat springs, 16, each of which is formed with sufficient curvature or bow to occupy the space between the outer looped end, 15, of the spring, 9, and the adjacent wall of the fitting, 3.

Preferably, and as shown in Fig. 1, the bottom of each centering spring 16 rests upon the bottom of the fitting or upon a lining plate, presently referred to, and both ends of the spring 16 are seated upon the vertical wall of the recess for the spring 9.

It will be understood that when under load or other conditions causing the spring, 9, to deflect, that owing to its arcuate form when normal, there will be a spreading or elongation of the spring when under such load, and the bow springs, 16, are provided to accommodate such change of length.

During the change of length of the springs, 9, just referred to, the loop, 15, will travel or slide along the bottom of the pocket for the spring end in the fitting, 3, and to prevent wear of the fitting, and also of the loops, 15, by such action, there is provided a wear-plate, 17, of anti-friction or non-metallic material such as fibre or the equivalent thereof.

The spring, 9, as previously stated which is of the semi-elliptic type, is made up of several leaves, the first or bottom one of which is of sufficient length to be bent back on itself, forming the loop, 15, and terminating in a clamp, or clip, 18, which serves to secure such termination in position, and also acts in the usual manner of such devices for binding the assembly of leaves at that point.

It is desirable to lubricate the spring at its point of support, and for that purpose advantage is taken of the spaces in the pocket of the fitting, 3, and also of the opening, or eye, of the loop, 15, for packing therein a quantity of oil-soaked waste, or other absorbent or lubricant-retaining substance, which will provide the lubrication in a simple and obvious manner.

When the spring, 9, is flexed to its limit by the maximum load designed to be imposed thereon, the end loop, 15, will bear upon the wall, 14, and at the same time press outwardly against the inner wall of the pocket. There will be a tendency for the portion of the loop that is in contact with the wall, 14, to bend at that point, and in the absence of provision to the contrary, it would be liable to crystallize. To prevent this the wall, 14, has, at the upper portion thereof, an outwardly-rounded lip as shown over which the spring may bend in a rather gradual curve, thus reducing the tendency to crystallization.

Figure 4 shows the invention applied to a rear axle. It is observable that the general outline of the loop, 15, is in the form of a hook, and that the fitting, 3, must be assembled thereon before bolting the said fitting, 3, by means of the ears, 5, thereon, in position on the axle by means of a bolt 4 and a lug 2$^x$ provided on the axle. It will be noticed that the hook formation of the said loop, 15, together with the overhanging lip, 10, and the wall, 14, operate for movably anchoring the several parts together, that is, the wall, 14, guarding against displacement of the spring longitudinally thereof, and the lip, 10, preventing the hook-shaped loop from withdrawing vertically from the fitting, 3.

In both Fig. 1 and Fig. 4, it is observable that the loops 15 are somewhat hook-shaped. This is chiefly so that the end portion of the loop rather than the lateral portion thereof shall bear upon the wear-plate 17.

While the drawings show an embodiment of the invention wherein the supporting spring is attached to the chassis of a vehicle, and the end fittings as secured to the axle, it is manifest without further delineation that the relation may be reversed,—that is to say, the center of the spring may be secured to the axle and the end fitting, 3, for the spring secured to the chassis as is the practice in light trucks and trailers, where the springs are placed longitudinally of the vehicle frame.

I claim:—

1. In combination with a vehicle body and an axle, a leaf spring secured intermediate its ends to one of said parts and having a smoothly rounded end affording a convex bearing surface adapted to react transversely of the length of the spring, and a pocket secured to the other part, affording a cooperating bearing surface and being adapted to hold a lubricating packing therein, the opening of said pocket extending transversely of the bearing surface therein.

2. In combination with a vehicle body and an axle therefor a leaf spring situated intermediate its ends to one of said parts having a smoothly rounded end, the other part being provided with a pocket to receive said end of the spring and opening toward the middle of the spring together with the yielding means associated with the pocket bearing transversely against the spring outside the pocket and adjacent its opening substantially in a direction parallel to that of the bearing pressure of the spring on the bearing surface in the pocket.

3. In combination with a vehicle body and an axle therefor a leaf spring secured intermediate its ends to the body and having a smoothly rounded end, a pocket mounted on the axle to receive said end of the spring and opening toward the middle of the spring, the axle having a spring perch a lug on the pocket attached to said perch by a single bolt and a pin extending from the pocket into the axle to check pivotal movement about said bolt.

4. In the structure defined in claim 1, the pocket comprising a box-like structure having an opening at one side for introducing the spring end therein, said opening having a curved or rounded edge for contact with the flat side of the spring thus introduced.

5. In the structure defined in claim 1, the pocket including a housing overhanging the leaf spring, a plunger guided in said housing and a helical spring in the housing reacting through the plunger against the leaf spring.

6. In the structure defined in claim 1, a bow spring interposed between the said loop and one of the walls of said pocket.

7. In the structure defined in claim 1, one of the leaves of said spring being bent back on itself forming a loop at the bent end and terminating in a clip for securement to the spring at a distance from said loop.

8. In the combination defined in claim 1, the smoothly rounded end portion of the spring being bent to extend transversely and the pocket having an overhanging wall or lip and a vertical wall interposed between the bent end portion and the middle portion of the spring with a lateral opening between said lip and wall, whereby the spring is interlocked with the pocket.

9. In combination with a vehicle body and an axle therefor, a leaf spring secured intermediate its ends to one of said parts, said spring having smoothly rounded ends, and the other part being provided with pockets to receive said ends of the spring, said pockets opening oppositely and toward the middle portion of the spring.

10. In the combination defined in claim 9, yielding means in each pocket opposite the opening adapted to permit longitudinal extension of said spring under load.

11. In the combination defined in claim 1, yielding means in the pocket opposite the opening engaging the end portion of the spring and permitting longitudinal extent thereof under a load.

12. In combination, a vehicle part, a spring pocket secured thereon, a leaf spring having its end loosely seated in the pocket, and a shock-absorber exerting pressure on the spring near its end in a direction substantially parallel to that of the spring's pressure on its seat in the pocket.

13. In the combination defined in claim 12 the shock-absorber comprising a housing secured to said pocket, and a movable take-up device in the housing.

In testimony whereof, I have hereunto set my hand at Chicago, Illinois, this 9th day of July, 1920.

LOUIS J. GENETT.